United States Patent
Steen et al.

(10) Patent No.: US 7,401,868 B2
(45) Date of Patent: Jul. 22, 2008

(54) METHOD FOR OPTIMIZING A BRAKING SEQUENCE

(75) Inventors: Marcus Steen, Angered (SE); Anders Eriksson, Göteborg (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 11/306,761

(22) Filed: Jan. 10, 2006

(65) Prior Publication Data

US 2006/0279137 A1     Dec. 14, 2006

Related U.S. Application Data

(63) Continuation of application No. PCT/SE2004/000883, filed on Jun. 7, 2004.

(30) Foreign Application Priority Data

Jul. 10, 2003     (SE) .................................... 0302069

(51) Int. Cl.
*B60T 13/00*     (2006.01)

(52) U.S. Cl. .............................. 303/20; 701/93; 701/96; 180/170

(58) Field of Classification Search .................... 303/20, 303/191, 177, 141, 142; 701/91, 93, 70, 701/36, 94, 95, 96, 98; 180/170, 178, 197
See application file for complete search history.

(56) References Cited

U.S. PATENT DOCUMENTS

| | | | | |
|---|---|---|---|---|
| 5,659,304 A | * | 8/1997 | Chakraborty | ................ 340/903 |
| 5,832,400 A | * | 11/1998 | Takahashi et al. | ............. 701/53 |
| 6,029,107 A | * | 2/2000 | Sato | ............................ 701/58 |
| 6,076,622 A | | 6/2000 | Chakraborty et al. | |
| 6,330,507 B1 | | 12/2001 | Adachi et al. | |

FOREIGN PATENT DOCUMENTS

| | | |
|---|---|---|
| EP | 1302357 A1 | 4/2003 |
| FR | 2813397 A1 | 3/2002 |
| FR | 2813397 A1 * | 3/2002 |
| WO | WO-03/041987 A1 * | 5/2003 |

OTHER PUBLICATIONS

International Search Report dated Aug. 4, 2004 from International Application PCT/SE2004/000883.

* cited by examiner

*Primary Examiner*—Pam Rodriguez
(74) *Attorney, Agent, or Firm*—Novak Druce + Quigg LLP

(57) ABSTRACT

A method for optimizing a braking sequence in a vehicle with automatic transmission (3) and gearbox (9) and automatic cruise control, which cruise control controls acceleration and braking to achieve a set speed, taking into account the distance to the vehicle in front. Data simulations are carried out continually of how the vehicle will be driven in the future, for a set of different combinations of engine speed at which a gear change takes place, gear change step and braking sequence, and a braking sequence with associated gear change schedule is selected that will be optimal. The vehicle is equipped with at least two different braking systems, for example service brake and auxiliary brake (48, 6). The system selects to brake primarily with the braking system that has the least tendency to wear.

8 Claims, 3 Drawing Sheets

METHOD FOR OPTIMIZING A BRAKING SEQUENCE

CROSS-REFERENCE TO RELATED APPLICATIONS

The present application is a continuation patent application of International Application No. PCT/SE2004/000883 filed 7 Jun. 2004 which is published in English pursuant to Article 21(2) of the Patent Cooperation Treaty, and which claims priority to Swedish Application No. 0302069-0 filed 10 Jul. 2003. Said applications are expressly incorporated herein by reference in their entireties.

TECHNICAL FIELD OF THE INVENTION

The present invention relates to a method for optimizing a braking sequence in a vehicle with automatic transmission and gearbox and automatic cruise control functionality. The invention also relates to a computer program for causing a computer to carry out such a method.

BACKGROUND OF THE INVENTION

An adaptive cruise control system (ACC) in a vehicle measures the distance to a vehicle in front. This distance information is used to modify the adaptive cruise control in such a way that the distance to the vehicle in front is never less than a predetermined value.

When a vehicle in front is driving more slowly than the vehicle in question, the adaptive cruise control must ensure that the vehicle in question is braked. This can be carried out in a number of ways. For example, the fuel supply to the motor of the vehicle in question can be shut off completely so that the vehicle slows down. If all the fuel is shut off and additional braking is required, this can be carried out using the vehicle's service brake. A disadvantage of using the vehicle's service brake is that the service brake is a friction brake with a tendency to wear. For this reason, particularly on heavy goods vehicles, so-called auxiliary brakes are often used. Examples of auxiliary brakes are motor compression brakes and retarders. When an auxiliary brake is arranged in the vehicle's motor or between the motor and the gearbox, the gear selection is of great significance for what braking force is applied to the vehicle's driving wheels.

A vehicle with cruise control is shown in U.S. Pat. No. 6,076,622 and in which the cruise control can also control the gear selection and auxiliary braking. A problem with this solution is that the gear selection and the auxiliary braking cannot be optimized with regard to future topography. For example, at the start of a long steep down-grade, a sufficiently low gear will not be selected, which eventually leads to the auxiliary braking becoming insufficient at a relatively early stage on the gradient and it becoming necessary for additional braking to be carried out with the service brake in order to avoid driving into the vehicle in front.

A vehicle with cruise control is known through FR 2813397, where a control system with a navigation system using position determination (GPS, Global Positioning System) calculates in advance the highest and lowest points, that is the transitions where an uphill gradient changes to a downhill gradient or vice versa, for the immediately imminent road on which the vehicle is being driven. The distance to a vehicle in front is optimized by the control system controlling the acceleration and braking with the vehicle's service brake, taking into account the highest and lowest points on the road on which the vehicle is being driven. A problem with this solution is that the most favorable braking sequence can not be selected taking into account brake wear and gear selection. In addition, the future topography, in accordance with which the cruise control carries out the control, is greatly simplified. Only the transitions in gradient along the road on which the vehicle is being driven are calculated. The topography between the transitions in gradient is not taken into account.

SE 0103630-0 shows a known motordriven vehicle with cruise control, where a control system calculates future topography using a navigation system with position determination (GPS, Global Positioning System) or by extrapolation. By means of simulation, the control system selects an acceleration and/or retardation that is matched to the future topography, by controlling the acceleration and braking. A problem with this solution is that the most favorable braking sequence cannot be selected which takes into account brake wear, gear selection and distance to the vehicle in front.

Against the background of the above, the task of the invention is thus to make it possible to control a vehicle's braking sequence in a more optimal way, in a vehicle with cruise control of the ACC type (Adaptive Cruise Control), with acceleration function, brake function and distance measurement to the vehicle in front.

SUMMARY OF INVENTION

In at least one embodiment, the invention takes the form of a method for optimizing a braking sequence in a vehicle with automatic transmission, gearbox and automatic cruise control. The cruise control controls the acceleration and braking to achieve a set speed, taking into account the distance to the vehicle in front. The method is characterized by the fact that data simulations are carried out continually regarding how the vehicle will be driven in the future, for a set of different combinations of engine speed at which a gear change takes place, gear change step and braking sequence, and a braking sequence with associated gear change schedule is selected that will be optimal for the given conditions.

An advantage of the inventive method is that the vehicle will be braked in an optimal way, on the basis of given conditions. The correct gear change schedule and sufficient braking force will be selected for the selected optimal braking sequence so that the required retardation is obtained.

According to an advantageous second embodiment of the method according to the invention, the vehicle is equipped with at least two different braking systems and, when selecting the gear change schedule and braking sequence, the cruise control chooses to brake primarily with the braking system that has the least tendency to wear. The braking system can consist of at least one service brake and at least one auxiliary brake.

An advantage is that this ensures that brakes that have a tendency to wear, such as service brakes, are worn minimally. Auxiliary brakes with less tendency to wear are utilized to a greater extent.

BRIEF DESCRIPTION OF THE DRAWINGS

In the following, the present invention will be described in greater detail with reference to the accompanying drawings, which show additional preferred embodiments of the invention for the purpose of exemplification, and in which.

DETAILED DESCRIPTION

Figure 1:
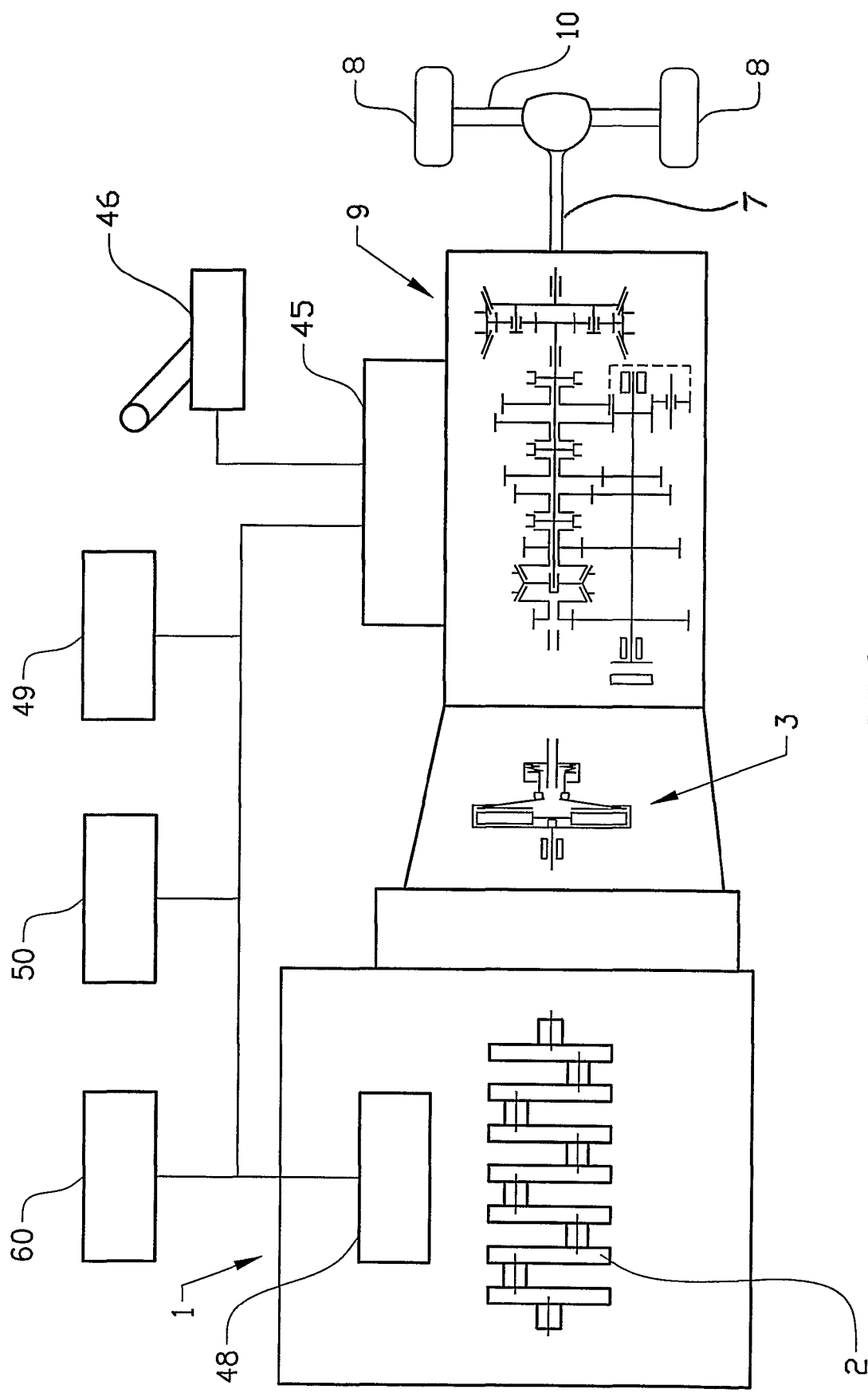
FIG. 1 shows a schematic illustration of a driveline configured according to a first embodiment of the invention.

FIG. 1 shows a schematic illustration of a first embodiment of a system according to the invention for optimizing a braking sequence in a vehicle. A motor 1 is connected via its outgoing shaft 2 to an automatic gearbox 9, which normally enables the vehicle to be driven with several different gears between the motor 1 and driving wheels 8. The gearbox 9 can be equipped with auxiliary gear boxes (for example split gear or range gear) in order to obtain more gears. An automatic disc clutch 3 is arranged between the motor 1 and the gearbox 9 for transferring torque from the motor 1 to the gearbox 9. A primary auxiliary brake 48 is arranged in the motor 1. It should be noted that the primary auxiliary brakes 48 can also be arranged between the motor 1 and the gearbox 9 or in the gearbox 9 on its ingoing shaft. An auxiliary brake of, for example, the compression type is arranged in the motor 1, while a retarder is normally arranged on the ingoing shaft of the gearbox 9. A drive shaft 7 transmits the force from the auxiliary brake 48 and the motor 1 from the gearbox 9 out to the driving wheels 8 via a rear axle 10.

In addition, the figure shows a first control unit 60 for controlling the motor 1, a second control unit 45 for controlling the transmission, a manual gear selector 46 connected to the transmission control unit 45, a third control unit 50 for controlling of the vehicle's service brake (not shown) and a inboard control unit 49 for controlling several functions in the vehicle, including the cruise control (not shown). The auxiliary brake 48 is controlled from the second control unit 45, via the first control unit 60. The auxiliary brake 48 can be of the compression or counter-pressure type.

The control units are arranged to communicate with each other in an integrated way by, among other things, utilizing each other's sensors.

The control units 60, 50, 45 and 49 consist preferably of control computer units with microprocessors and memory units. A control computer unit can be a part of the vehicle's inboard computer system, or alternatively it can be comprised in some other control arrangement or can be a freestanding unit in the vehicle.

The cruise control (not shown) is of a known type with the functions ON/OFF, SET/COAST and RESUME/ACCEL. In addition, the cruise control contains a device for continually measuring the distance to the vehicle in front. The device for measuring distance can, for example, be of the radar type or of the laser type.

According to the invention, data simulations are carried out for future braking sequences when the control unit 45 receives input signals from the inboard control unit 49 to the effect that the distance to the vehicle in front is getting less or is going to get less and is approaching a predetermined minimum distance, which minimum distance can vary depending upon the speed of the vehicles in relation to each other, in relation to the ground and/or whether the vehicles are being driven on an uphill gradient or a downhill gradient. In addition, the minimum distance can be dependent upon the status/capacity of the different braking systems and/or the weight of the vehicle in question.

Figure 2:
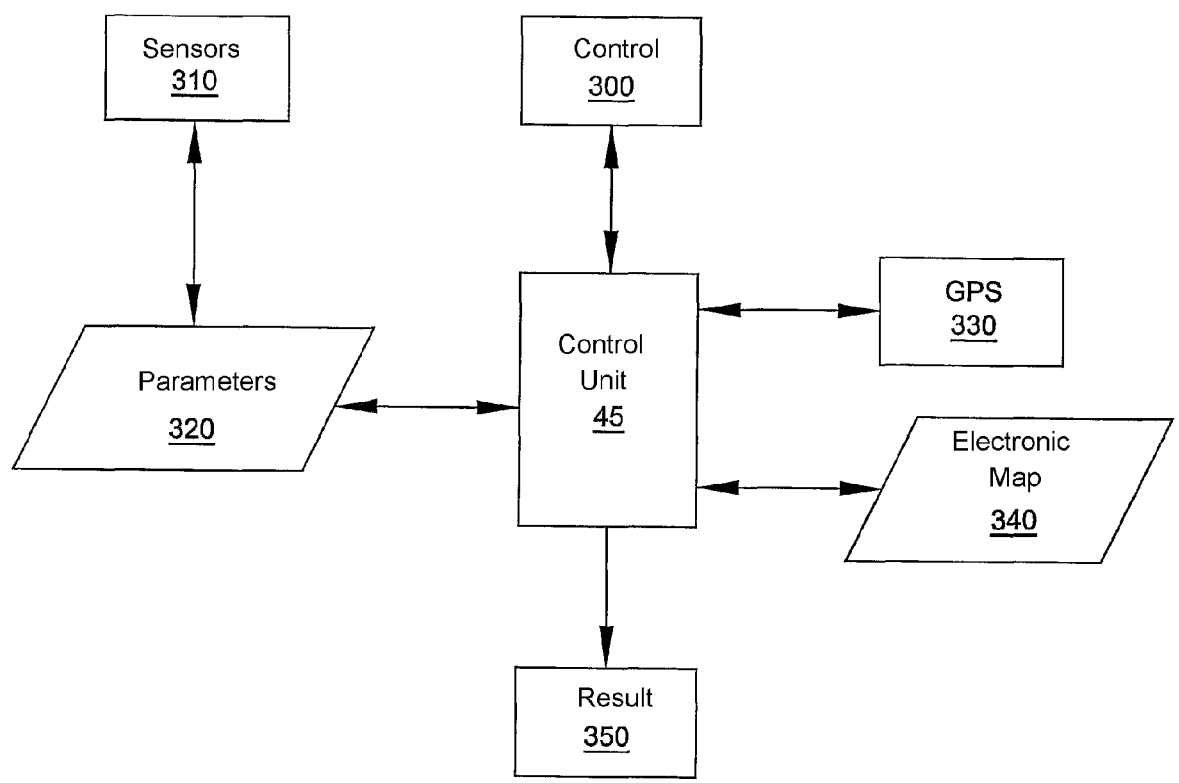
FIG. 2 shows an overview of inputs to the second control unit.

FIG. 2 schematically shows inputs that the control unit 45 requires in order to be able to carry out a data simulation. In the present invention, the simulation result 350 can be affected by a control 300 for manual or automatic control parameter weighting, which provides a criterion for driving characteristics selected by the driver.

The control 300 is arranged to communicate with the control unit 45. An electronic map 340, for example stored on a CD-ROM (Compact Disc Read Only Memory), comprises information about a region's topology [TN] that is necessary for the data simulation; that is, at least gradients or height values for roads on which the vehicle is being driven, for example with sea level as a reference. The data simulation comprises parameters 320 sent from meters and sensors 310, that can be obtained according to known technology. Concerning the vehicle in question, these consist of at least the weight of the vehicle or vehicle combination, current vehicle speed, gear changes, efficiency levels, engine speed, current position, road grade (gradient) (not from an electronic map) and resistance to forward motion. Resistance to forward motion is used herein to mean a value that has been calculated by the control unit 45 on the basis of signals indicating current engine torque and current vehicle acceleration and mass. The signals constitute an indication of the gradient of the road, any following wind or headwind, and the vehicle's roll resistance. In addition, information about the distance to the vehicle in front, the speed of the vehicle in front and a measurement of changes in the speed of the vehicle in front are taken into account.

The control unit 45 contains auxiliary brake models 310, comprising at least braking torque as a function of engine speed. With the necessary information, the control unit 45 can calculate (simulate over a certain predetermined period of time) the braking sequence from an initial speed to a final speed, calculated on the basis of given conditions for a set of different gears, gear change schedules and braking force by solving equations using simulations and time steps. The best gear change schedule and the best control of the braking force produced by the auxiliary brakes are selected by comparing calculated braking sequences. The selected braking force can vary over time.

Similarly, a gear change schedule can be selected for the braking sequence; that is, during the braking sequence, the control unit 45 changes gear to a different selected gear at a particular selected point in time, at least once. The size of the gear step for a braking sequence is evaluated; that is, changing from, for example, 6th gear to 5th gear or from 6th gear to 4th gear. If the braking force from the auxiliary brake is calculated to be insufficient, then, depending upon how the weighting via the control 300 has been carried out, the control unit 45 will select to brake, for example, as much as possible and for as long as possible with the auxiliary brake 48 and to supplement the total braking force with a braking force from the service brake so that sufficient retardation is achieved. A different setting of the control 300 can mean that the control unit 45 selects a braking sequence such that the retardation is as comfortable as possible for the occupants of the vehicle. Thus a braking sequence is selected to have as even retardation as possible, and with as smooth of changes in retardation as possible, particularly at the beginning and at the end of the braking sequence.

Figure 3:
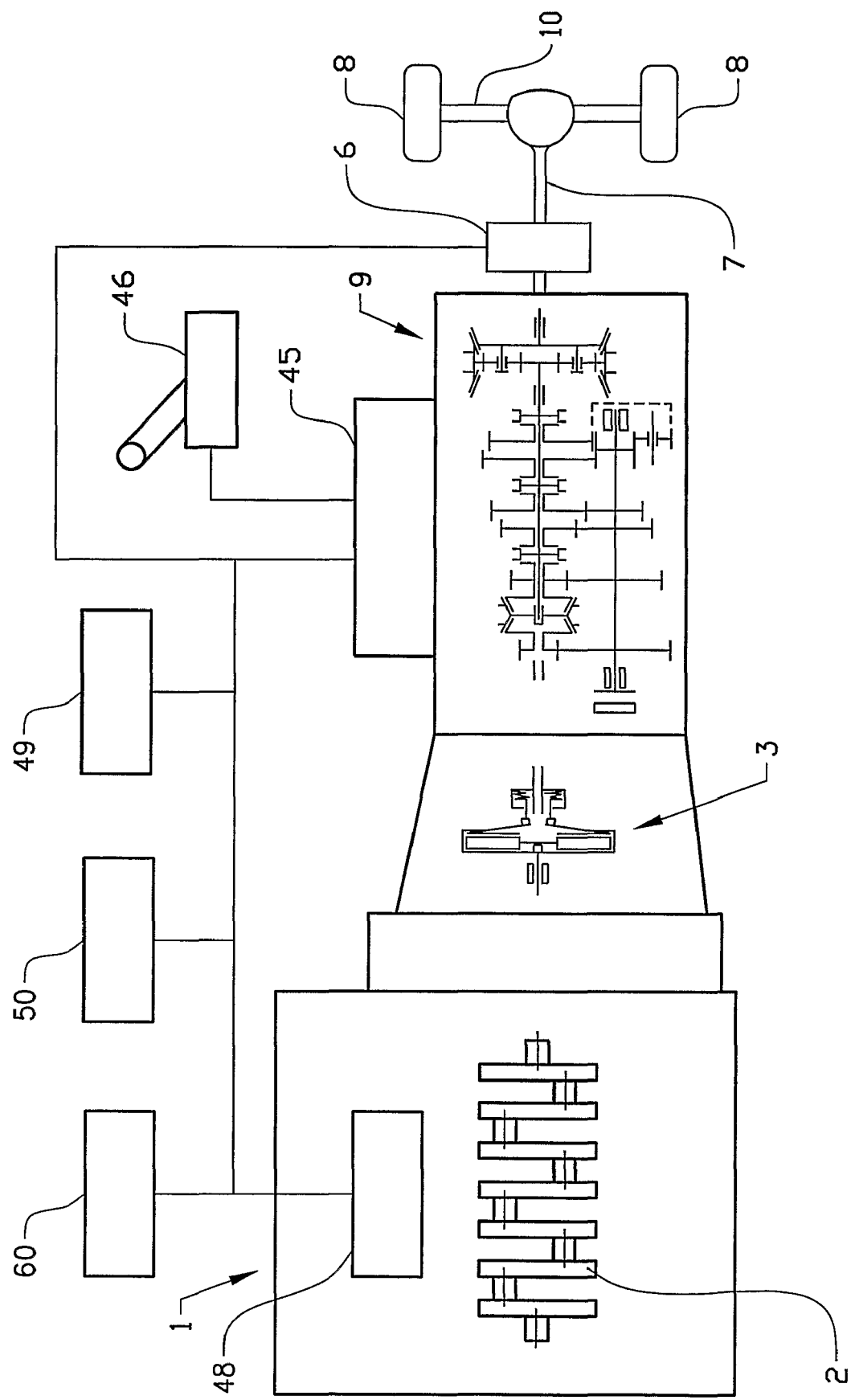
FIG. 3 shows a schematic illustration of a driveline configured according to a second embodiment of the invention.

FIG. 3 shows a second preferred embodiment of the invention. The embodiment according to FIG. 3 differs from the embodiment in FIG. 1 in that a secondary auxiliary brake 6 is connected to the outgoing shaft of the gearbox 9. The secondary auxiliary brake is normally of the hydrodynamic or electromagnetic retarder type. The vehicle's drive shaft 7 is normally connected to the outgoing shaft of the secondary auxiliary brake. According to the example shown, the secondary auxiliary brake 6 is controlled by the inboard control unit 49. Thus a secondary auxiliary brake is taken into account during the simulation of the braking sequence by the control unit 45. The most optimal way of controlling the auxiliary brakes, the gearbox and the service brakes is selected on the basis of given conditions and on the basis of control parameter weighting selected via the control 300, which in this embodiment can also comprise weighting concerning the extent to which the respective auxiliary brake is to be utilized in a braking sequence.

In an additional embodiment, the vehicle can be equipped with additional different types of auxiliary brakes. Thus, different braking scenarios are simulated with these auxiliary brakes being applied to different extents, together with different gear change schedules, and the most optimal braking sequence with associated gear change schedule is selected.

The invention is, of course, not limited to the embodiments described above, but can be modified within the framework of the following claims.

What is claimed is:

1. A method for optimizing a braking sequence in a vehicle with automatic transmission (3) and gearbox (9), automatic cruise control, and at least two different braking systems (48, 6), said method comprising:

controlling acceleration and braking using the automatic cruise control to achieve a set speed;

taking into account the distance to the vehicle in front;

using a computer program for conducting data simulations on a continuous basis of how the vehicle will be driven in the future in consideration of at least a set of different combinations of engine speed at which a gear change takes place, a gear change schedule and the braking sequence; and selecting the braking sequence with associated gear change schedule that will be optimal for the given conditions;

wherein when selecting the gear change schedule and braking sequence, the cruise control chooses to brake primarily with the braking system (48, 6) that has the least tendency to wear.

2. The method as recited in claim 1, wherein the braking system comprises at least one service brake and at least one auxiliary brake (48, 6).

3. The method as recited in claim 1, wherein the braking force from an auxiliary brake (48, 6) is dependent upon the gear selected in the gearbox (9).

4. The method as recited in claim 1, wherein the braking sequence is optimized in such a way that an even and sufficient retardation for a predetermined final speed is obtained.

5. The method as recited in claim 1, wherein a current vehicle position is determined by means of a position determination system (330, 340) which is connected to a control unit (45) for determination of the current position of the vehicle.

6. The method as recited in claim 1 wherein the computer program comprises program code that is executed by a computer.

7. The method as recited in claim 1, wherein the computer program comprises program code stored on a medium that can be read by a computer.

8. The method as recited in claim 1, wherein the computer program is loaded directly into an internal memory in a digital computer.

* * * * *